United States Patent [19]

Burkey

[11] Patent Number: 5,431,474
[45] Date of Patent: Jul. 11, 1995

[54] FLEXIBLE VEHICLE CARGO COVER

[76] Inventor: Robin L. Burkey, 5904 Moki Alcova Rt., Casper, Wyo. 82604

[21] Appl. No.: 286,506

[22] Filed: Aug. 5, 1994

[51] Int. Cl.⁶ .............................................. B60P 7/02
[52] U.S. Cl. .................................................... 296/100
[58] Field of Search ...................... 296/100, 136; 52/3; 150/166, 167; 160/370.2 R

[56] References Cited

U.S. PATENT DOCUMENTS

| | | | |
|---|---|---|---|
| 2,465,621 | 3/1949 | Wheeler | 296/100 X |
| 3,481,371 | 12/1969 | Row | 296/100 X |
| 4,948,191 | 8/1990 | Cao | 296/136 X |
| 5,050,924 | 9/1991 | Hansen | 296/100 |

*Primary Examiner*—Joseph D. Pape
*Attorney, Agent, or Firm*—Risto A. Rinne, Jr.

[57] ABSTRACT

A flexible cover that is applied over the bed of a pickup truck is described as including a plurality of flexible arches that are disposed along at least two sides of a substantially rectangular center section. The arches are disposed in a concave orientation with an apex of each arch disposed generally furthest away from the center of the cover. A seam, according to one embodiment, traverses along the perimeter of each arch and at least one cable, cord, or strap is disposed therein. At each apex the seam is omitted to permit access to the cable, cord, or strap. The cable, cord, or strap is capable of longitudinal motion within the longitudinal length of each seam. The ends of the cable, cord, or strap preferably contain a ring that is used to attach a first end of a fastener thereto. A fastener fist end is also attached to the cable, cord, or strap at each apex. A second end of each of the fasteners is attached where desired to the underside of the bed. When fastened to the bed, each cable, cord, or strap moves longitudinally within each seam of each arch to evenly distribute the tightening forces and to accommodate oversize cargo items which extend above the plane as defined by the top of the bed of the pickup. According to an alternative embodiment, the seam is either omitted or the cable, cord, or strap is simply not inserted therein. Each cable, cord, or strap is instead attached directly to the perimeter of each of the flexible arches and similarly serves to distribute the tightening forces over the greater perimeter length of the cover as is provided by the arches.

20 Claims, 2 Drawing Sheets

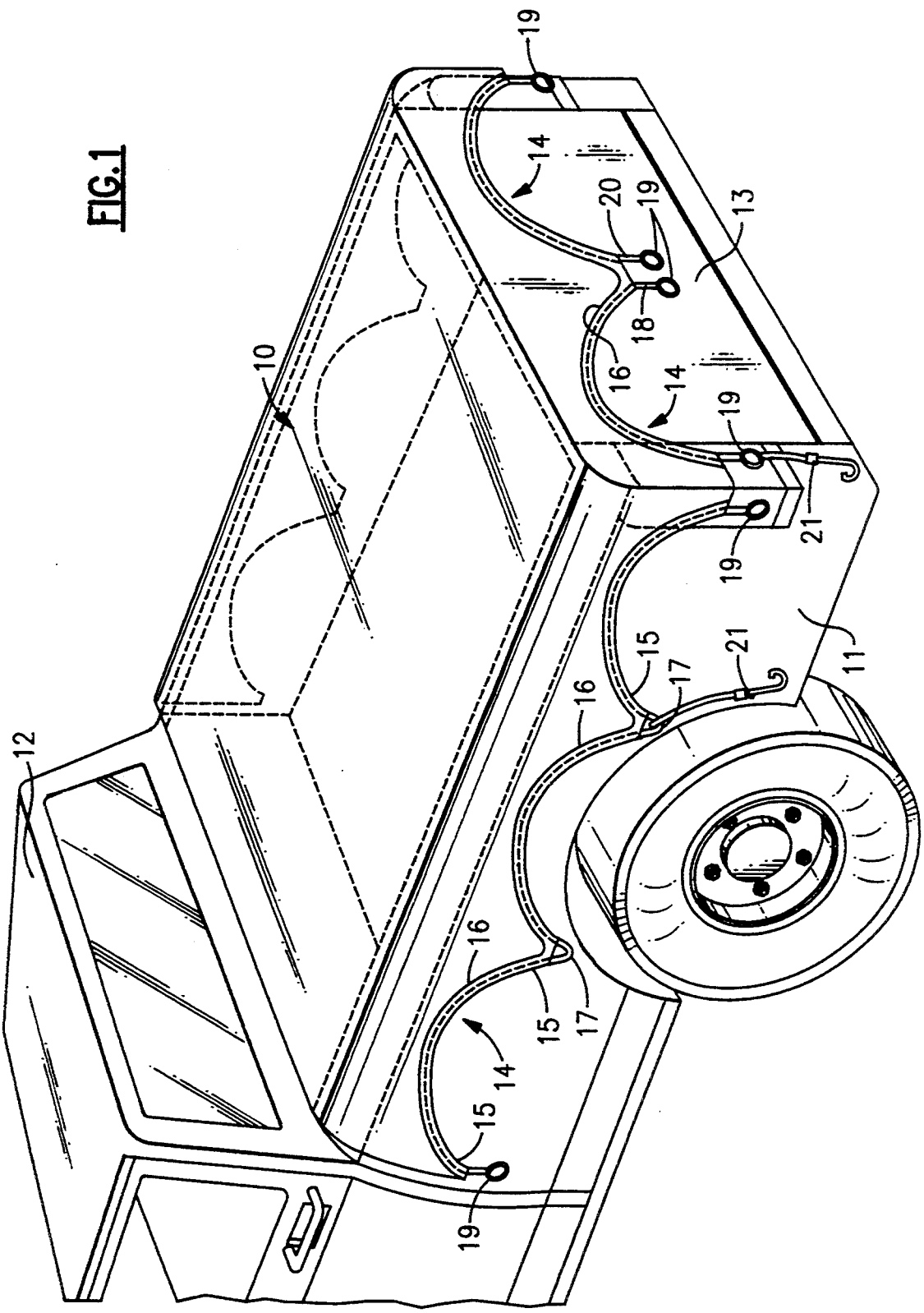

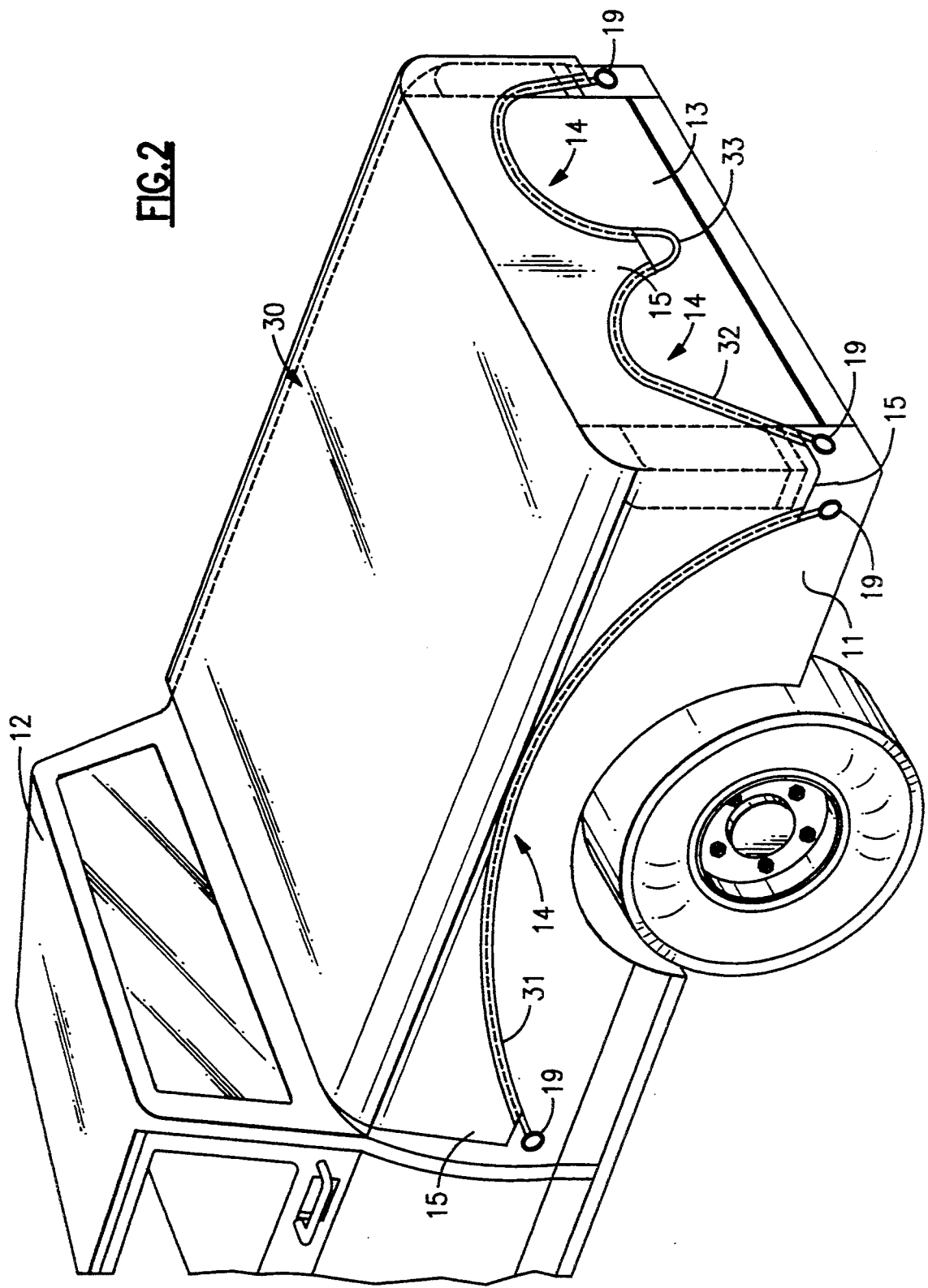

FLEXIBLE VEHICLE CARGO COVER

BACKGROUND OF THE INVENTION

1. Field of the Invention

The present invention, in general, relates to vehicle cargo covers and, more particularly, to flexible vehicle cargo covers placed over the bed of a pickup truck.

Flexible types of covers for pickup trucks are known and are presently referred to, generally, as tonneau types of pickup bed covers. However fastening such types of covers to the bed of the vehicle has heretofore proven difficult to achieve, especially when a portion of the load that is placed inside the pickup be extends higher than the top of the bed of the pickup truck.

Existing tonneau covers do not accommodate very large loads because such kinds of covers fasten to snaps or hooks placed along the perimeter of the bed of the pickup truck. An very large load stretches such kinds of covers to the point where they simply cannot reach the fasteners that are fixedly attached to the exterior of the bed of the vehicle.

Also many pickup truck owners do not desire to deface the appearance of their pickup truck by attaching snap fasteners or hooks to the exterior of their pickup truck bed.

Furthermore, when tonneau covers are normally tightened "hot spots" arise whereby the material which comprises the cover is placed under disproportionate strain. Hot spots are caused by the excessive force necessary to stretch the cover over the bed of the pickup in order to reach the attached fasteners. The greatest strain to the cover is experienced in proximity to each fastener that is used. It is in this area where existing types of tonneau covers are most likely to fail.

This problem is further aggravated when the cover must be stretched over a portion of a slightly oversized cargo item. In this instance the cover can be stretched enough to reach the attached fasteners but in order to do so a significant strain is applied to the cover which tends to considerably shorten its useful life.

Also because of the need to align existing tonneau covers so that their position corresponds exactly with fixedly attached fasteners, present covers tend to be difficult and time consuming to attach and to remove.

Accordingly there exists today a need for a flexible vehicle cargo cover that can easily be placed over the bed of a pickup truck that does not require the use of snaps, hooks, or other fasteners that are permanently attached to the exterior of the bed of the vehicle and which can accommodate cargo items that extend above the top of the bed of the pickup truck and which equalize the tightening forces that are applied about the perimeter of the cover.

2. Description of Prior Art

Cargo covers are, in general, known. For example, the following patents describe various types of these devices:

U.S. Pat. No. 4,823,707 to Salsbury et al, Apr. 25, 1989;

U.S. Pat. No. 4,848,824 to Smith et al, Jul. 18, 1989;

U.S. Pat. No. 4,877,283 to Little et al, Oct. 31, 1989;

U.S. Pat. No. 4,900,204 to Summers, Feb. 13, 1990;

U.S. Pat. No. 4,979,776 to Schwickert, Dec. 25, 1990;

U.S. Pat. No. 5,040,934 to Ross, Aug. 20, 1991;

U.S. Pat. No. 5,050,924 to Hansen, Sep. 24, 1991; and

U.S. Pat. No. 5,165,750 to Pirhonen, Nov. 24, 1992.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a flexible vehicle cargo cover that is easy to install.

It is also an object of the invention to provide a flexible vehicle cargo cover that is easy to remove.

Another object of the invention is to provide a flexible vehicle cargo cover that is able to accommodate cargo items which extend above the top of the bed of a pickup truck.

Still another object of the invention is to provide a flexible vehicle cargo cover that does not include any hardware items that are fixedly attached to the vehicle.

Yet another object of the invention is to provide a flexible vehicle cargo cover that distributes the tightening forces evenly about the perimeter of the cover.

Still yet another important object of the invention is to provide a flexible vehicle cargo cover that includes a reinforced arcuately formed perimeter.

Briefly, a flexible vehicle cargo cover that is constructed in accordance with the principles of the present invention has either a single cord, cable, or strap (or a plurality thereof) which are either housed within a seam that is attached to the perimeter of the cover or are otherwise attached to the cover at the perimeter which includes a plurality of flexible arches that are attached in a concave manner to at least two sides of the cover. The cover and the arches are formed of any preferred flexible type of material including fabric, vinyl, netting, or similar types of materials. The cord, cable, or strap, or the plurality thereof must be flexible to adapt to the shape of the arches and may be formed of either an elastomeric or a non-stretching type of material. When disposed within the seam each cord, cable, or strap is free to permit longitudinal motion thereof within the longitudinal length of each seam to occur. The arches are either attached separately to the cover or are formed integral with it. When a single cord, cable, or strap is used its length is preferably longer than the sum of the lengths of the perimeters of the arches. Disposed at the apex of each of the plurality of arches is provided a gap in the seam which allows access to a segment of the single cord, cable, or strap at each apex or access to each end of each of the plurality thereof. When a plurality of cords, cables, or straps are used, each of the plurality is longer than the perimeter length of each arch so that each end extends beyond each apex. Rings are preferably attached to each end thereof. A fastener is used to fasten the rings that are disposed at each end of each of the cords, cables, or straps to the underside of a bed of a pickup truck and to apply as much tightening force as is desired. Similarly a fastener is used to fasten the cord, cable, or strap at each exposed segment to the underside of the bed as desired. While a fastener is not required to fasten every exposed segment or every ring to the bed a preferred fit of the cover about the bed is obtained when each ring or segment is secured to the bed. The cords apply a tightening force that is distributed evenly among each of the arches along the perimeter of the cover. Accordingly by distributing the tightening forces about the perimeter of the cover, the useful life of the cover is extended during normal use. When large cargo items are placed in the bed which extend above the top of the bed, the cover can be properly secured to the vehicle because the arches serve to prevent excessive stress from occurring at certain locations of the cover by distributing the force evenly about the entire perimeter of the cover. The fasteners are adjusted to compensate for any change in position of the rings or of the exposed segments of cord. Accordingly careful positioning of the cover about the vehicle is not necessary.

BRIEF DESCRIPTION OF THE DRAWING

FIG. 1 is a view in perspective of a flexible vehicle cargo cover attached to a bed of a pickup truck.

FIG. 2 is a view in perspective of an alternative embodiment of the flexible vehicle cargo cover wherein at least one strap is attached to the perimeter of the cover.

DETAILED DESCRIPTION OF THE INVENTION

Referring to FIG. 1 is shown, a flexible vehicle cargo cover, identified in general by the reference numeral 10. The cover 10 is situated atop a bed 11 of a pickup truck 12. A portion of the cover 10 overlaps the exterior of a tailgate 13 of the truck 12 and each of the two exterior sides (also referred herein as the sidewalls) of the bed 11.

The amount of overlap over the tailgate 13 and over the exterior sides of the bed 11 of pickup are varied to suit preferences. For example, a larger overlap is appropriate if, from time to time, oversized loads are anticipated. (The manner by which the cover 10 can accommodate oversize loads is described in greater detail hereinbelow.) Conversely, a smaller amount of overlap, for certain people, provides a preferred aesthetic appearance when smaller cargo items or no cargo items are transported.

The cover 10, as shown, is made of a flexible material such as fabric, vinyl, or any similar type of material. The cover includes a central area which covers the bed 11 of the pickup 12 and must therefore be generally rectangular in shape so as to overlap the bed 11 sidewalls. Of course the size of the cover 10 is varied to accommodate small, medium, and large pickup 12 truck beds 11, as well as to vary the amount of preferred overlap over the bed 11 sidewalls as is described hereinabove.

The cover 10 includes a plurality of adjacent perimeter arches, identified in general by the reference numeral 14. The perimeter arches 14 are each formed of an arcuate portion with each apex 15 of each arch 14 extending in a direction that is furthest away from the rectangular central portion of the cover 10. Therefore the arches 14 are concave (as opposed to convex) with respect to the cover 10.

The arches 14 may be attached to the rectangular central portion of the cover 10 by sewing or by other methods known to the art including thermal welding as well as by the use of an adhesive, or alternatively the arches 14 may be formed integrally as part of the overall cover 10 as shown in the preferred embodiment as is herein illustrated and described.

The perimeter arches 14 are also formed of a flexible material that is either identical to or similar to that which is used to form the central portion of the cover 10.

The perimeter arches 14 include a seam 16, according to a first preferred embodiment that is described herein, that runs along the perimeter of three sides of the cover 10. At each apex 15 the seam 16 is omitted for a predetermined length to allow access to a cable 17 that is disposed inside the seam 16.

The seam 16 as referred to herein applies interchangeably to consideration of the seam 16 along the full perimeter length of the three sides as it does to consideration of each seam 16 which is disposed along the perimeter length of the arcuate portion of each arch 14. Accordingly the text and illustrations clarify whether the use of the term seam 16 refers in particular to each arch 14 or to the sum of the perimeter lengths of all of the arches 14 when necessary, and when it is not so specified, the discussion applies equally well to either.

The cable 17 as shown is formed of a continuous length of material that transverses in a contiguous fashion the length of the seam 16 along one side of the bed 11. Of course the cable 17 could easily be extended so as to be contiguous for the entire length of the seam 16 extending fully around each of the two sides of the bed 11 and also around the tailgate 13 as well. By illustrating that the cable 17 may be contiguous for a plurality of arches 14, the drawing figure thereby also teaches that it can be made contiguous for any number of arches 14, including all of the arches 14 of any particular cover 10.

The cable 17 as shown is formed of any suitable material including natural and synthetic fabric, wire, webbing, or strapping, or of an elastomeric material and while it is housed within the seam 16, it is capable of moving longitudinally within the longitudinal length of the seam 16. The cable 17 is used to secure the cover 10 to the truck 12, and its use for that purpose is described in greater detail hereinbelow.

A segmented cord 18 is shown in the vicinity of the tailgate 13 as an alternative to the continuous length cable 17 and is also capable of longitudinal motion within the seam 16. The segmented cord 18 is formed of a fabric and is disposed within the seam 16 of only one of the arches 14 and is constructed so as to be slightly longer than the length of the seam 16. Of course the segmented cord 18, if desired, could be extended in length so as to pass through the seam 16 of a plurality of arches 14.

The segmented cord 18 includes two ends each of which extend beyond the seam 16 at each apex 15. Each of the two ends preferably includes a ring 19 that is attached to the end thereof. Each ring 19 is used to secure the cover to the truck 12 as is described in greater detail hereinafter. A ring 19 is also preferably attached at each end of the cable 17 that was described hereinabove, and is similarly used. If the ring 19 is omitted the end of the cable 17 is formed into a loop (not shown) or other hardware is provided at each cable 17 end to aid in fastening the cover 10 to the bed 11.

The front of the cover 10 (i.e. That portion of the cover 10 that is disposed opposite to the tailgate 13) does not normally include any perimeter arches 14 as it would not be practical to affix the cover 10 as is described in greater detail hereinbelow to the outside of the bed 11 area that is located intermediate the bed 11 and the cab of the truck 12.

An elastomeric cord 20 is shown in the vicinity of the tailgate 13 adjacent to and as an alternative to the segmented cord 18. The elastomeric cord 20 is formed of an elastomeric material that is also housed within the seam 16. While the elastomeric cord 20 is only shown in the seam 16 of one arch 14 it can of course be extended in length to pass through the seam 16 of a plurality of arches 14.

The elastomeric cord 20 stretches when a tightening force is applied to it and this is beneficial for use with certain types of fasteners having a limited capability to reach the underside of the bed as is described in greater detail hereinbelow in order to attach the cover 10 to the bed 11.

A fastener 21 is shown attached to the cable 17 at one apex 15 at the sidewall of the bed 11 and to the ring 19 of the segmented cord 18 at the rear of the bed 11. The fastener 21 includes a first end which is attached to either the cable 17 or the ring 19 and a second end which is attached where desired to the underside of the bed 11. Any of a variety of fasteners 21 may be used and are available commercially. The fastener may be of a non-stretching type as shown or an elastomeric type of fasteners (not shown) may be employed. As many fasteners 21 are used as is necessary to adequately secure the cover 10 to the bed 11. It is preferable to use one fastener 21 at each apex 15 and at each ring 19 to achieve an optimum fit of the cover 10 about the bed 11.

When the fasteners 21 are tightened, the cable 17 or the segmented cord 18 or the elastomeric cord 20 (or plurality thereof) are urged closer toward the underside of the bed 11. As they move closer to the bed 11 underside, they apply a force which tends to stretch the cover 10. This force is distributed evenly through the seam 16 as each cable 17, cord 18, or elastomeric cord 20 moves longitudinally a small amount within the seam 16 of each arch 14. As a natural result of the shape of each arch 14, which is disposed in a concave-in manner toward the center of the cover 10, the tightening force is thus distributed evenly along the entire perimeter length of each seam 16 by each cable 17, cord 18, or elastomeric cord 20.

Accordingly, the cover 10 does not experience localized areas of great stress along any portion of its perimeter as would occur in a modified seam area (not shown) of a modified type of cover (not shown) which did not include the arches 14 or with other types of modified covers (not shown) which rely upon snap or hook fasteners (not shown) that are attached at predetermined locations to the bed 11 of the truck 12.

The arches 14 evenly distribute the forces that are applied to the cover 10 when the cover is fastened to the bed 11. When a large cargo item (not shown) is placed in the bed 11 that protrudes above the top of the bed 11, the modified type of cover as described hereinabove will experience great stress if it is pulled with sufficient force to engage the snap or hook fasteners that are attached to the bed 11. If the large cargo item extends far enough above the bed 11 it will not even be possible to attach the modified type of cover to the snap or hook fasteners without tearing or otherwise damaging the modified type of cover.

The cover 10, as herein described, is easily attached even when large cargo items are placed in the bed 11. Each fastener 21 is merely extended to accommodate the oversize cargo item and to adapt to the location of rings 19 and exposed segments of the cables 17. Another benefit that is provided by the cover 10 is that there are no snap fasteners, hooks, or other hardware that are permanently or otherwise attached to the exterior of the bed 11. When the cover 10 is removed, the bed 11 is in factory new condition. Many truck 12 owners are reluctant to attach hardware items to the bed 11 for aesthetic reasons.

When short fasteners (not shown) are used or when special types of fasteners (not shown) are used, the length of which cannot be varied, the elastomeric cord 20 provides the necessary adjustment to accommodate such types of short or special fasteners by stretching as required. Accordingly for certain types of applications an elastomeric cord 20 is preferred for use within the seam 16 of each arch 14.

Referring now to FIG. 2, a second preferred embodiment is herein described wherein a modified cover, identified in general by the reference numeral 30, is shown. Similar reference numerals are used to describe similar components appearing in FIG. 1. The modified cover 30 includes a strap 31 that is attached to the modified cover 30 along one side thereof. The strap 31 is formed of natural or synthetic webbing material such as nylon and is attached to the modified cover 30 by sewing, gluing, thermal welding, or by any other suitable process.

Only one of the perimeter arches 14 is shown as being formed along one side of the bed 11 of the truck 12. However as is shown in FIG. 1, a plurality of arches 14 may be used along any side of the modified cover 30. The strap 31 is attached to the arch 14 along the arcuate portion of the arch 14. Rings 19 are attached to each end thereof which extend beyond each of the apexes 15. The rings 19 are useful to secure the modified cover 30 to the bed 11 by use of the fasteners 21 (not shown in FIG. 2).

A plurality of two arches 14 are shown overlapping the tailgate 13 and a continuous strap 32 is attached thereto to the two arches 14. Intermediate the two arches 14 over the tailgate 13, the continuous strap 32 extends beyond the apex 15 where it is not attached to the modified cover 30. At this location the continuous strap 32 forms a loop 33 that is useful to attach one of the fasteners (not shown) thereto.

Of course, the continuous strap 32 may be extended in length to include all of the arches 14 or any preferred number of arches 14. Similarly as many of the straps 31 may be used as there are arches 14, if desired.

The continuous strap 32 (or the straps 31) that are attached to the arches 14 distribute the tightening forces along the perimeter length of each arch 14. The tightening forces are applied to the modified cover 30 by the fasteners (not shown) when the modified cover 30 is secured to the bed 11 and accordingly, serve to accomplish the objectives of the invention as described hereinbefore.

It is obvious that for any size of bed 11 the arches 14 of the cover 10 or of the modified cover 30 increase the perimeter length thereof as opposed to the known prior type of a rectangular cover (not shown). Accordingly, any force that is applied to secure the cover 10 or the modified cover 30 to the bed 11 is distributed over a greater perimeter length than would be the situation with the shorter perimeter length of the rectangular cover.

The same force, when applied to a greater perimeter length, lessens the amount of force that is applied to any unit of perimeter length thereby reducing the stress upon the perimeter of either the cover 10 or of the modified cover 30. Reduced stress to either the cover 10 or the modified cover 30 serve to increase the useful life thereof.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A vehicle cargo cover for covering a generally rectangular shaped top of a bed of a pickup truck, comprising:
   a) a flexible material having a shape corresponding substantially with the shape of said bed;
   b) a plurality of arches disposed about the perimeter of at least two sides of said material, each of said arches including a concave portion that is disposed toward the center of said material and having two apexes, each of said apexes being disposed furthest away from said center of said material;
   c) a plurality of seams attached to the perimeter of each of said arches, said seams being non-continuous between said apex of one of said arches and said apex of said adjacent arch; and
   d) at least one cord disposed within each of said seams, said cord capable of longitudinal motion thereof within the longitudinal length of each of said seams;
   whereby when a force is applied to said at least one cord to secure said cover to said bed, said at least one cord moves within each of said seams to distribute said force evenly about the perimeter of said material.

2. The vehicle cargo cover of claim 1 wherein each of said at least one cord includes a first and a second end and a ring is attached to each of said first and said second ends.

3. The vehicle cargo cover of claim 1 wherein said at least one cord includes a plurality of cords.

4. The vehicle cargo cover of claim 1 wherein each of said at least one cord is disposed within only one of said seams.

5. The vehicle cargo cover of claim 1 wherein each of said at least one cord is disposed within a plurality of said seams.

6. The vehicle cargo cover of claim 1 wherein said at least one cord is formed of a fabric.

7. The vehicle cargo cover of claim 1 wherein said at least one cord is formed of a cable.

8. The vehicle cargo cover of claim 1 wherein said at least one cord is formed of an elastomeric material.

9. The vehicle cargo cover of claim 1 including at least one fastener for securing said at least one cord to said bed.

10. A vehicle cargo cover for covering a generally rectangular shaped top of a bed of a pickup truck, comprising:
    a) a flexible fabric material having a shape corresponding substantially with the shape of said bed;
    b) a plurality of arches disposed adjacent to each other about the perimeter of at least two sides of said material, each of said arches including a concave portion that is disposed toward the center of said material and having two apexes, each of said apexes being disposed furthest away from said center of said material;
    c) a plurality of seams attached to the perimeter of each of said arches, said seams being non-continuous between said apex of one of said arches and said apex of said adjacent arch; and
    d) a cord disposed within each of said seams, said cord capable of longitudinal motion thereof within the longitudinal length of each of said seams;
    whereby when a force is applied to said cord to secure said cover to said bed, said cord moves within each of said seams to distribute said force evenly about the perimeter of said material.

11. The vehicle cargo cover of claim 10 wherein said cord includes a first and a second end and a ring is attached to said first and said second ends.

12. The vehicle cargo cover of claim 10 wherein said cord is disposed within a plurality of said seams.

13. The vehicle cargo cover of claim 10 wherein said cord is formed of a fabric.

14. The vehicle cargo cover of claim 10 wherein said cord is formed of a cable.

15. The vehicle cargo cover of claim 10 wherein said cord is formed of an elastomeric material.

16. The vehicle cargo cover of claim 10 including at least one fastener for securing said cord to said bed.

17. A vehicle cargo cover for covering a generally rectangular shaped top of a bed of a pickup truck, comprising:
    a) a flexible material having a shape corresponding substantially with the shape of said bed;
    b) a plurality of arches disposed about the perimeter of at least two sides of said material, each of said arches including a concave portion that is disposed toward the center of said material and having two apexes, each of said apexes being disposed furthest away from said center of said material;
    c) at least one flexible strap attached to the perimeter of each of said arches;
    whereby when a force is applied to said at least one flexible strap to secure said cover to said bed, said at least one flexible strap distributes said force evenly about the perimeter of each of said arches.

18. The vehicle cargo cover of claim 17 wherein each of said at least one flexible strap includes a first and a second end and a ring is attached to each of said first and said second ends.

19. The vehicle cargo cover of claim 17 wherein said at least one flexible strap includes a plurality of flexible straps.

20. The vehicle cargo cover of claim 17 wherein said at least one flexible strap is formed of a fabric.

* * * * *